(12) United States Patent
Krause (10) Patent No.: US 8,866,332 B2
(45) Date of Patent: Oct. 21, 2014

(54) CIRCUIT ARRANGEMENT FOR POWER DISTRIBUTION IN A MOTOR VEHICLE

(75) Inventor: Axel Krause, Nesslau (CH)

(73) Assignee: BRUSA Elektronik AG, Sennwald (CH)

( * ) Notice: Subject to any disclaimer, the term of this patent is extended or adjusted under 35 U.S.C. 154(b) by 482 days.

(21) Appl. No.: 13/320,899

(22) PCT Filed: Jun. 16, 2010

(86) PCT No.: PCT/IB2010/052697
§ 371 (c)(1),
(2), (4) Date: Dec. 22, 2011

(87) PCT Pub. No.: WO2010/150139
PCT Pub. Date: Dec. 29, 2010

(65) Prior Publication Data
US 2012/0098331 A1 Apr. 26, 2012

Related U.S. Application Data

(60) Provisional application No. 61/221,028, filed on Jun. 26, 2009.

(30) Foreign Application Priority Data

Jun. 24, 2009 (CH) .......................... 982/09

(51) Int. Cl.
*B60L 1/00* (2006.01)
*H02J 7/02* (2006.01)
(Continued)

(52) U.S. Cl.
CPC ............... *H02J 7/022* (2013.01); *Y02T 90/121* (2013.01); *H02M 2001/007* (2013.01);
(Continued)

(58) Field of Classification Search
None
See application file for complete search history.

(56) References Cited

U.S. PATENT DOCUMENTS 3,517,300 A  6/1970  McMurray
(Continued)

FOREIGN PATENT DOCUMENTS

CA   1106915 B   8/1981
DE   1638344 A1  9/1969
(Continued)

OTHER PUBLICATIONS

International Search Report (ISR) dated Jan. 20, 2010 from Swiss national application CH0982/2009.
(Continued)

*Primary Examiner* — Jared Fureman
*Assistant Examiner* — Terrence Willoughby
(74) *Attorney, Agent, or Firm* — George Kapsalas; Patentbuero Paul Rosenich AG (57) ABSTRACT

A circuit arrangement (1) for power distribution in a motor vehicle is described, which comprises a transformer ($T_1$, $T_{1a} \ldots T_{1n}$) having at least three transformer windings ($W_1$, $W_{1a} \ldots W_{1n}$, $W_2$, $W_{2a} \ldots W_{2n}$, $W_3$, $W_{3a} \ldots W_{3n}$). A first and second on-board supply inside the vehicle and a power supply which is outside the vehicle can be connected to the circuit arrangement (1), which supplies are coupled via the transformer windings ($W_1$, $W_{1a} \ldots W_{1n}$, $W_2$, $W_{2a} \ldots W_{2n}$, $W_3$, $W_{3a} \ldots W_{3n}$) and converters ($UR_1$, $UR_2$, $UR_{2a} \ldots UR_{2n}$, $UR_3$, $UR_{3a} \ldots UR_{3n}$). The third converter ($UR_3$, $UR_{3a} \ldots UR_{3n}$) can be connected via a first change-over switch ($US_1$, $US_{1'}$) alternatively to the first on-board supply inside the vehicle or to the power supply outside the vehicle. A plurality of first converters (UR 1) and/or a plurality of second converters ($UR_2$, $UR_{2a} \ldots UR_{2n}$) and/or a plurality of third converters ($UR_3$, $UR_{3a} \ldots UR_{3n}$) each being connected to the transformer windings ($W_1$, $W_{1a} \ldots W_{1n}$, $W_2$, $W_{2a} \ldots W_{2n}$, $W_3$, $W_{3a} \ldots W_{3n}$) can be switched in series or in parallel are provided.

20 Claims, 10 Drawing Sheets

(51) Int. Cl.
*H02J 7/14* (2006.01)
*H02M 3/335* (2006.01)
*B60L 11/18* (2006.01)
*H02J 7/00* (2006.01)
*H02M 1/00* (2006.01)

(52) U.S. Cl.
CPC ............ *Y02T 10/7094* (2013.01); *Y02T 90/122* (2013.01); *H02M 2001/0074* (2013.01); *H02J 7/1423* (2013.01); *H02M 3/33592* (2013.01); *Y02T 90/127* (2013.01); *Y02T 10/7005* (2013.01); *B60L 11/1824* (2013.01); *Y02T 10/92* (2013.01); *Y02T 10/7055* (2013.01); *H02J 7/0054* (2013.01); *Y02T 90/14* (2013.01); *H02J 7/0013* (2013.01); *B60L 11/1818* (2013.01); *H02J 2007/0059* (2013.01); *B60L 11/1811* (2013.01); *H02M 3/33569* (2013.01); *B60L 11/182* (2013.01)
USPC ................... 307/9.1; 307/10; 363/16; 363/17

(56) References Cited

U.S. PATENT DOCUMENTS

| | | | |
|---|---|---|---|
| 4,017,784 | A | 4/1977 | Simmons et al. |
| 4,152,636 | A | 5/1979 | Gorden |
| 4,336,486 | A | 6/1982 | Gorden et al. |
| 4,591,775 | A | 5/1986 | Nussel et al. |
| 4,685,039 | A | 8/1987 | Inou et al. |
| 5,198,970 | A * | 3/1993 | Kawabata et al. ............... 363/37 |
| 5,200,887 | A | 4/1993 | Ioroi et al. |
| 5,555,494 | A | 9/1996 | Morris |
| 5,633,577 | A | 5/1997 | Matsumae et al. |
| 5,650,923 | A | 7/1997 | Suzuki et al. |
| 5,710,698 | A | 1/1998 | Lai et al. |
| 5,754,413 | A | 5/1998 | Fraidlin et al. |
| 5,872,707 | A | 2/1999 | Asplund |
| 5,949,662 | A | 9/1999 | Boldin et al. |
| 5,973,939 | A | 10/1999 | Tan |
| 6,169,683 | B1 | 1/2001 | Farrington |
| 6,297,616 | B1 * | 10/2001 | Kubo et al. ................... 320/116 |
| 6,337,801 | B2 | 1/2002 | Li et al. |
| 6,388,904 | B2 | 5/2002 | Nomura |
| 6,490,183 | B2 | 12/2002 | Zhang |
| 6,765,810 | B2 | 7/2004 | Perry |
| 6,794,846 | B2 * | 9/2004 | Tsuji ............................. 320/103 |
| 6,917,531 | B2 | 7/2005 | Scheel et al. |
| 7,149,096 | B2 | 12/2006 | Batarseh et al. |
| 7,187,566 | B2 | 3/2007 | Kawashima et al. |
| 7,498,776 | B2 | 3/2009 | Nishimura |
| 7,593,244 | B2 | 9/2009 | Sodo et al. |
| 7,679,941 | B2 | 3/2010 | Raju et al. |
| 7,746,669 | B2 | 6/2010 | Falk |
| 7,768,800 | B2 | 8/2010 | Mazumder et al. |
| 7,944,723 | B2 | 5/2011 | Crane |
| 8,009,443 | B2 | 8/2011 | Krause |
| 8,213,188 | B2 | 7/2012 | Tada et al. |
| 8,411,473 | B2 | 4/2013 | Cheng et al. |
| 2002/0126517 | A1 | 9/2002 | Matsukawa et al. |
| 2003/0133317 | A1 | 7/2003 | Norrga |
| 2005/0083716 | A1 | 4/2005 | Marquardt |
| 2008/0190906 | A1 | 8/2008 | Aigner |
| 2008/0284386 | A1 | 11/2008 | Nishimura |
| 2008/0316774 | A1 * | 12/2008 | Ito et al. ........................... 363/17 |
| 2010/0008107 | A1 | 1/2010 | Mallwitz et al. |
| 2010/0220501 | A1 | 9/2010 | Krause |
| 2011/0261591 | A1 | 10/2011 | Krause |

FOREIGN PATENT DOCUMENTS

| | | |
|---|---|---|
| DE | 1763299 A1 | 10/1971 |
| DE | 2127497 A1 | 12/1972 |
| DE | 2624532 A1 | 12/1977 |
| DE | 2737541 A1 | 2/1978 |
| DE | 3305224 A1 | 8/1984 |
| DE | 4416679 A1 | 12/1994 |
| DE | 19646666 A1 | 6/1997 |
| DE | 19750041 C1 | 1/1999 |
| DE | 19941170 A1 | 3/2001 |
| DE | 10051156 A1 | 5/2002 |
| DE | 10151153 A1 | 4/2003 |
| DE | 102006055126 A1 | 6/2008 |
| EP | 0116925 A2 | 8/1984 |
| EP | 0152719 A1 | 8/1985 |
| EP | 0670236 A1 | 9/1995 |
| EP | 1227571 A2 | 7/2002 |
| EP | 1391982 A2 | 8/2003 |
| EP | 0903830 B9 | 5/2005 |
| EP | 1643626 A2 | 4/2006 |
| EP | 1926205 A1 | 5/2008 |
| EP | 1971016 A2 | 9/2008 |
| JP | 2002-223565 A | 8/2002 |
| JP | 2003111413 A | 4/2003 |
| JP | 2005006455 A | 1/2005 |
| WO | 86/04749 A1 | 8/1986 |
| WO | 93/20614 A1 | 10/1993 |
| WO | 2006/125410 A1 | 11/2006 |
| WO | 2007/060506 A2 | 5/2007 |

OTHER PUBLICATIONS

PCT International Search Report and Written Opinion from WO2010150139 parent application of the present application; dated Aug. 4, 2010.

Pinheiro, J.R. et al. "Isolated Interleaved-Phase-Shift PWM DC-DC ZVS Converters," from IEEE 2000 Industry Applications Conference, Oct. 8-12, 2000, Piscataway NJ, pp. 2383-2388; ISBN: 978-0-7803-6401-1.

Steigerwald, R.L. et al. "A Comparison of High Power DC-to-DC Soft-Switched Converter Topologies," from IEEE 1994 Annual Conference of the Industry Applications Society, Oct. 2-6, 1994, Denver,Colorado, pp. 1090-1096; ISBN:978-0-7803-1993-6.

* cited by examiner

CIRCUIT ARRANGEMENT FOR POWER DISTRIBUTION IN A MOTOR VEHICLE

This application is a 35 U.S.C. 371 national-phase entry of PCT International application no. PCT/IB2010/052697 designating the U.S. filed on Jun. 16, 2010, which is a non-provisional of prior U.S. provisional application No. 61/221,028 filed on Jun. 26, 2009; application PCT/IB2010/052697 also claims benefit of priority to prior Swiss national application no. 0982/09 filed on Sep. 1, 2009; the entireties of PCT appl. no. PCT/IB2010/052697, of Swiss application no. 0982/09 and of U.S. application No. 61/221,028 are all expressly incorporated herein by reference in their entirety, for all intents and purposes, as if identically set forth in full herein.

The invention relates to a circuit arrangement for power distribution in a motor vehicle, in particular in an electric motor vehicle, comprising:

a transformer having at least three magnetically coupled transformer windings, a first connection for a first on-board supply which is inside the vehicle and is coupled via a first converter to a first transformer winding, a second connection for a second on-board supply which is inside the vehicle and is coupled via a second converter to a second transformer winding, a third connection for a power supply which is inside the vehicle and is coupled via a third converter to a third transformer winding, and a first change-over switch via which the third converter can be connected alternatively a) to the first connection or b) to the third connection.

Finally, the invention relates to a motor vehicle having the above circuit arrangement and two on-board supplies.

Battery- or accumulator-operated electric vehicles are indispensable nowadays. Although their existence was limited for a long time to niche applications, for example as fork-lift trucks and mining cars, the introduction of electric vehicles into road traffic in large numbers is now imminent. However, the requirements with regard to electric vehicles have also changed decisively thereby. The desire for engine powers of 100 kW or more is a particular challenge for the designers of these vehicles. In order to keep the currents for these powers within tolerable limits, relatively high voltages are provided for the drive units. For example, 400 VDC are provided as a voltage in the on-board drive supply. At a peak power of 100 kW, a current as high as 250 A therefore still flows.

However, not all devices in a motor vehicle are designed for such a high voltage. For example, lighting, various actuators for electric windows, seat adjustment, etc, and entertainment systems are as a rule—for historic reasons too—designed for a DC voltage of 12 VDC. For this reason, in general two on-board supplies having different voltage levels are operated in an electric vehicle. For charging a drive battery and—if present—a battery for the on-board low-voltage supply, electric vehicles moreover have a connection to a power supply outside the vehicle. This may be a conventional alternating current supply with the voltage of 230 VAC typical in Europe or a DC voltage supply—for example fed by solar collectors. The power supply outside the vehicle is not necessarily stationary; a connection to another electric motor vehicle is also conceivable. From the above statements, it is clear that precautions must be taken for the energy transfer between the individual supplies. The prior art discloses some circuit arrangements for this purpose.

For example, US2008/0316774A1 discloses a circuit arrangement for power distribution, in particular in an electric vehicle, in which a main or driving battery, an auxiliary battery for the on-board supply and a connection to the alternating current supply are connected via a transformer having a primary coil and two secondary coils. During the charging process, power is distributed via the two secondary coils to the driving battery and the auxiliary battery. In addition, the auxiliary battery can be charged from the driving battery, and the driving battery from the auxiliary battery.

Furthermore, U.S. Pat. No. 5,633,577A shows a circuit arrangement for an electric car, in which a driving battery, an on-board supply battery and a connection to the alternating current supply are coupled via a transformer having three windings. The driving battery and the on-board supply battery can be charged from the alternating current supply, and the on-board supply battery from the driving battery.

In addition, DE3305224A1 discloses a circuit arrangement for an electric vehicle, in which a connection to an AC voltage supply is connected to a driving battery via an autotransformer. In addition, an additional winding for charging an auxiliary battery from the driving battery can be provided on the core of the autotransformer.

Finally, DE19646666A1 discloses a charging apparatus for a battery-operated vehicle having at least one driving battery for operating an electric motor and at least one on-board battery for supplying an on-board supply. This charging apparatus consists of a controlled chopper circuit which can be connected with the aid of a change-over device alternatively to the driving battery or, via a rectifier circuit, to a power supply. On the output side, the chopper circuit is applied to the primary winding of a transformer, via the secondary winding of which the on-board battery can be charged.

It is an object of the invention to provide an improved circuit arrangement for the power distribution in a motor vehicle, or an improved motor vehicle. In particular, it is intended to reduce the cost of the circuit and/or electrical losses due to the circuit.

According to the invention, this object is achieved by circuit arrangements having features as disclosed herein and motor vehicles having features as disclosed herein.

According to the invention, the circuit arrangement of the type mentioned at the outset additionally comprises the feature that c) a plurality of first windings connected to a plurality of first converters, wherein the first converters may be switched in series or in parallel, are provided and/or d) a plurality of second windings connected to a plurality of second converters, wherein the second converters may be switched in series or in parallel, are provided and/or e) a plurality of third windings connected to a plurality of third converters, wherein the third converters may be switched in series or in parallel, are provided.

According to the invention, a motor vehicle according to the invention comprises the above circuit arrangement according to the invention, in which the first connection is connected to a first on-board supply inside the vehicle and the second connection is connected to a second on-board supply inside the vehicle.

By means of the invention, on the one hand, the converter for the on-board supply can be designed as a simple, i.e. unidirectional, converter or rectifier, without having to dispense with the possibility of transferring energy from the first on-board supply to the second on-board supply. The circuit arrangement is therefore simpler in terms of circuit technology or in terms of control. Moreover, the energy losses during the energy transfer can be reduced because a separate voltage converter with respect to the second on-board supply is not absolutely essential. The voltage adaptation can—if at all necessary—be performed by a voltage converter in any case generally present with respect to the power supply outside the vehicle.

On the other hand, different voltage levels may be adapted to each other by switching the converters in series or in parallel as desired. Hence, according to the invention, voltage adaptation between the different connections of the circuit arrangement or between the different power supplies can moreover be carried out in a simple manner.

Although the invention was and will be explained on the basis of an electric motor vehicle, the invention does of course also relate to motor vehicles which are not electrically driven. In the context of the invention "motor vehicle" is moreover to be understood as meaning any motor-driven vehicle, i.e. land vehicles, including railway vehicles, water vehicles and aircraft.

At this point, it should be pointed out that a "converter" in the context of the disclosure can be understood as meaning a rectifier, an inverter or a bidirectional converter. The rectification can be effected, for example, with diodes, with transistors (e.g. MOSFET or IGBT or the like), thyristors or other rectifying elements (at least one each or combinations of stated elements). The inversion can be effected, for example, with transistors (e.g. MOSFET or IGBT or the like), thyristors or other switching elements (at least one each or combinations of stated elements). Accordingly, passive rectifiers, active rectifiers and/or active inverters are used.

In the context of the invention, "batteries" are to be understood as meaning chargeable batteries, accumulators or other current-storing media.

Finally, the term "change-over switch" designates an apparatus for alternative production of an electrical connection in one circuit branch or in a plurality of circuit branches. In particular, a change-over switch may also be composed of a plurality of synchronously actuated switching elements. These switching elements do not necessarily have a change-over function but may be limited to a switching on and switching off function. Elements whose resistance can be considerably changed are also to be understood in this sense. In the context of the invention, switching elements are therefore in particular transistors, thyristors, mechanical switches and relays or the like.

Finally, it is pointed out that the terms "couple" and "connect" or similar terms do not necessarily imply that two coupled or connected units, components or circuit parts are directly coupled or connected. Other, further circuits, units, components or circuit parts may also be arranged between the coupled or connected units, components or circuit parts without departing from the concept of the invention.

Advantageous configurations and further developments of the invention are evident or disclosed fom the totality of the description and considered together with the figures of the drawings.

It is advantageous if in case c), one first converter each is connected to one first winding each and/or in case d), one second converter each is connected to one second winding each and/or in case e), one third converter each is connected to one third winding each. In this way, the individual windings or converters can be actuated separately. By out-of-phase actuation, for example, current ripples can be substantially reduced.

It is also advantageous if the circuit arrangement comprises a voltage transformer which is arranged between the third converter and a) the first connection or b) the third connection, and a control which is connected to the voltage transformer and activates the voltage transformer in such a way that the voltage adaptation is effected in case a) between first and second connection and in case b) between third and second connection.

In this way, said voltage transformer can have a dual use and be used both for driving, i.e. for supplying the second on-board supply from the first on-board supply, and for charging, i.e. for supplying the vehicle from a power supply outside the vehicle.

A further advantageous variant of the circuit arrangement according to the invention comprises:

a voltage transformer which is arranged between second converter and the second connection of the second on-board supply, and a second change-over switch via which the voltage transformer can be bypassed in case a).

In case a), i.e. when the second on-board supply is supplied from the first on-board supply, the voltage adaptation between first and second on-board supply can be effected in principle by a voltage transformer arranged before the third converter. The voltage transformer for the second on-board supply is then not absolutely essential and can be bypassed with a switch.

It is furthermore advantageous if a voltage transformer which is arranged between second converter and the second connection for the second on-board supply is in the form of a step-down and/or step-up transformer and comprises a non-linear choke which has a high inductance in case a) and a low inductance in case b). Use is made of the fact that as a rule a power 10-20 times lower must be made available for the second on-board supply in the charging mode, i.e. during supply from a power supply outside the vehicle, than in the driving mode, i.e. during supply from the first on-board supply. Although the throttle winding is dimensioned for the high current in the driving mode, the magnetic circuit of the choke is preferably optimized so that the choke has the high inductance required for the voltage transformer function only at low current. At high current, however, the correspondingly designed magnetic circuit reaches saturation, so that the choke inductance drops thereby to very low values. Consequently, the choke can be made compact and produced economically.

In an advantageous configuration of the invention, the transformer windings are wound around a common core. In this way, good magnetic coupling between the windings can be achieved at low cost.

It is advantageous if the second transformer winding is in the form of a foil winding. If the power in the second on-board supply is relatively low compared with the first on-board supply, a space-saving and material-saving foil winding can be used for this transformer winding.

It is advantageous if the first connection and the second connection are provided for different voltage levels. In this variant, the transformer-coupling of the on-board supplies can be particularly advantageously employed.

Finally, it is advantageous if the circuit arrangement comprises a control for actuating the first change-over switch and/or the second change-over switch and/or the third converter. In this way, it is possible to switch easily between different operating states even if a plurality of elements is involved in the switching. Optionally, certain operating states (e.g. charging from an alternating current supply) can be automatically detected by appropriate sensors and the required measures can be taken. The control itself can be designed as software and/or hardware, for example as a central processing unit with a memory connected thereto, in which the steps and parameters required for carrying out the invention are stored.

The above configurations and further developments of the invention can be combined in any desired manner.

The present invention is explained in more detail below with reference to the working examples shown in the schematic figures of the drawing.

In the figures of the drawing, identical and similar parts are provided with identical reference numerals and functionally similar elements and features—unless stated otherwise—are provided with identical reference numerals but different indices.

Figure 1:
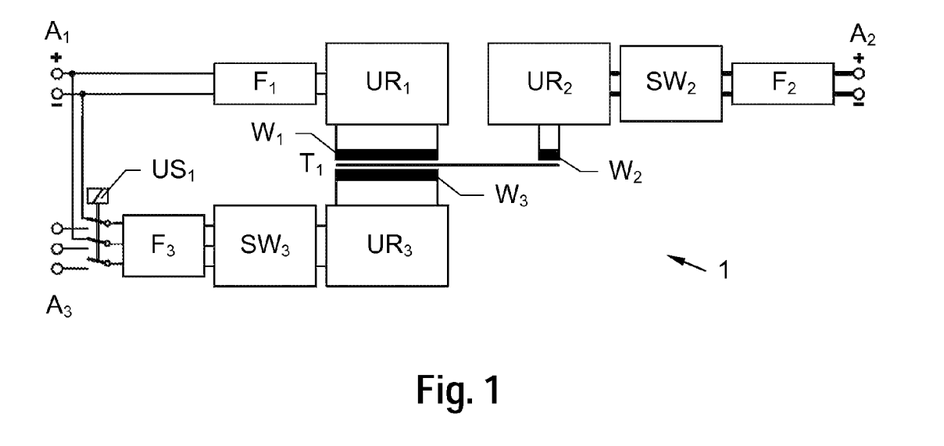
FIG. 1 schematically shows a first variant of the circuit arrangement according to the invention.

FIG. 1 shows a first embodiment of a circuit arrangement 1 according to the invention. This comprises a transformer $T_1$ having three magnetically coupled windings $W_1$, $W_2$ and $W_3$. In the preferred embodiment shown, these are wound around a common core. However, this is by no means essential, and the magnetic coupling can also be effected in another manner. In each case a first converter $UR_1$, a second converter $UR_2$ and a third converter $UR_3$ are connected to the three windings $W_1$, $W_2$ and $W_3$. The first converter $UR_1$ is connected via a first filter $F_1$ to a first connection $A_1$ for a first power supply or on-board supply inside the vehicle. The second converter $UR_2$ is connected via a voltage transformer $SW_2$ and a second filter $F_2$ to a second connection $A_2$ for a second power supply or on-board supply inside the vehicle. Finally, the third converter $UR_3$ is connected via a voltage transformer $SW_3$ and a third filter $F_3$ to a third connection $A_3$ for a power supply outside the vehicle. In addition, the circuit arrangement 1 comprises a first change-over switch $US_1$, by means of which the third converter $UR_3$ can be connected (here indirectly via the third filter $F_3$ and the voltage transformer $SW_3$) to the first connection $A_1$ or the third connection $A_3$.

For the following considerations, it is assumed—for easier representation—that the first on-board supply is a driving of a traction supply, for example with a voltage of 400 VDC. This supply therefore substantially comprises a battery or an accumulator, a driving motor and a regulator for the motor. Let the second on-board supply be a low-voltage auxiliary supply, for example with a voltage of 12 VDC. This supply comprises, for example, the supply of various controls (including on-board computer), the lighting, entertainment systems and auxiliaries motors, for example for electric windows and sliding roof. Let the power supply outside the vehicle be a conventional power supply, for example with a voltage of 230 VAC. Other configurations are of course also conceivable; for example, the power supply outside the vehicle may also be a direct current supply which is supplied from solar collectors or a second vehicle (for example in the course of breakdown assistance or in the case of vehicles coupled as trailers). Conversely—although not usual—the on-board supplies may also be alternating current supplies.

Figure 2:
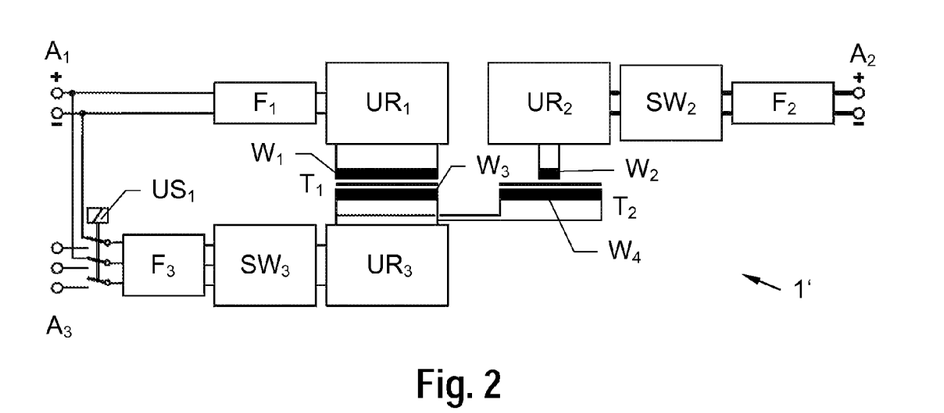
FIG. 2 schematically shows a second variant of a circuit arrangement according to the invention.

FIG. 2 shows a second, easily modifiable embodiment of a circuit arrangement 1' according to the invention. This has substantially the same design as the circuit arrangement 1 from FIG. 1 but here two transformers $T_1$ and $T_2$ having in each case two windings $W_1/W_3$ and $W_2/W_4$ are provided instead of a single transformer $T_1$ having three windings $W_1$, $W_2$, $W_3$.

It is pointed out here that the modified embodiment according to FIG. 2 may also form the basis for an independent invention, namely a circuit arrangement 1' for power distribution in a motor vehicle, comprising a first transformer $T_1$ having at least one first and one third magnetically coupled transformer winding $W_1$, $W_3$, a second transformer $T_2$ having at least one second and one fourth magnetically coupled transformer winding $W_2$, $W_4$, a first connection $A_1$ for a first on-board supply which is inside the vehicle and is coupled via a first converter $UR_1$ to the first transformer winding $W_1$, a second connection $A_2$ for a second on-board supply which is inside the vehicle and is coupled via a second converter $UR_2$ to the second transformer winding $W_2$, a third connection $A_3$ to a power supply which is outside the vehicle and is coupled via a third converter $UR_3$ to the third and fourth transformer winding $W_3$, $W_4$, and a first change-over switch $US_1$, $US_1'$, via which the third converter $UR_3$ can be connected alternatively a) to the first connection $A_1$ or b) to the third connection $A_3$.

In this case, a plurality of fourth windings which can be connected in series or in parallel may also be provided. In addition one third converter each can be connected to one fourth winding each.

Figure 3:
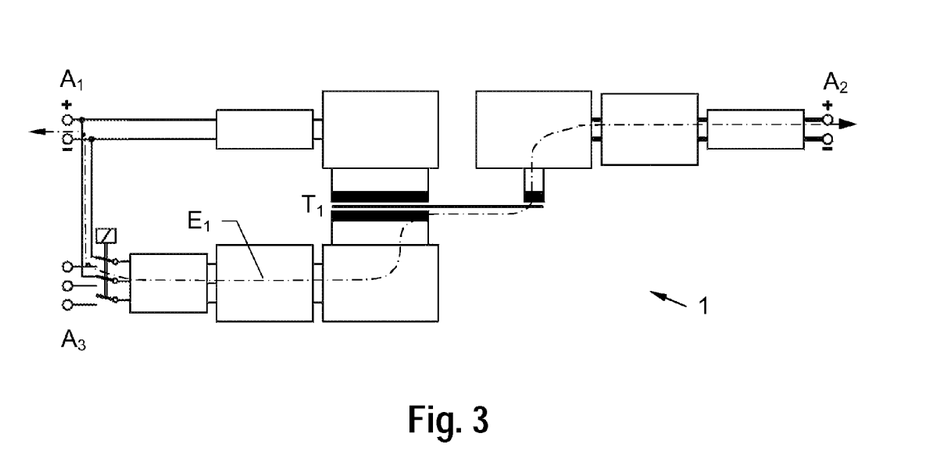
FIG. 3 schematically depicts the energy flow from a first on-board supply to a second on-board supply in a circuit arrangement according to the invention.

The function of the circuit arrangement 1 according to the invention will now be explained with reference to FIG. 3. The first change-over switch $US_1$ is present in a position in which the third converter $UR_3$ is connected to the first connection $A_1$ and hence to the first on-board supply, here a 400 VDC driving supply. The arrow shown as a dash-dot line now shows the energy flow $E_1$ from the first on-board supply into the second on-board supply or from the first connection $A_1$ to the second connection $A_2$ respectively vice versa.

The electrical power is fed via the third filter $F_3$, which is provided for reducing circuit feedbacks, to the voltage transformer SW$_3$, which brings the first on-board supply voltage to a suitable level for the following transformation to the second on-board supply voltage. In the example shown, the voltage of 400 VDC is reduced to about 230 VDC, for example with a step-down converter known per se. In the converter UR$_3$, this intermediate circuit voltage is now inverted and the electrical power is transmitted by inductive coupling from the third transformer winding W$_3$ to the second transformer winding W$_2$. There, the second converter UR$_2$ (in the simplest case a rectifier) ensures that the AC voltage is converted back into a DC voltage. In the next step, the electrical power is transmitted via a further voltage transformer SW$_2$ and a further filter F$_2$ to the second connection A$_2$ and hence to the second on-board supply. If the voltage has already been brought to a suitable level by the voltage transformer SW$_3$, the voltage transformer SW$_2$ can also be omitted or—optionally temporarily—bypassed (for this context, also see FIG. 8).

Figure 4:
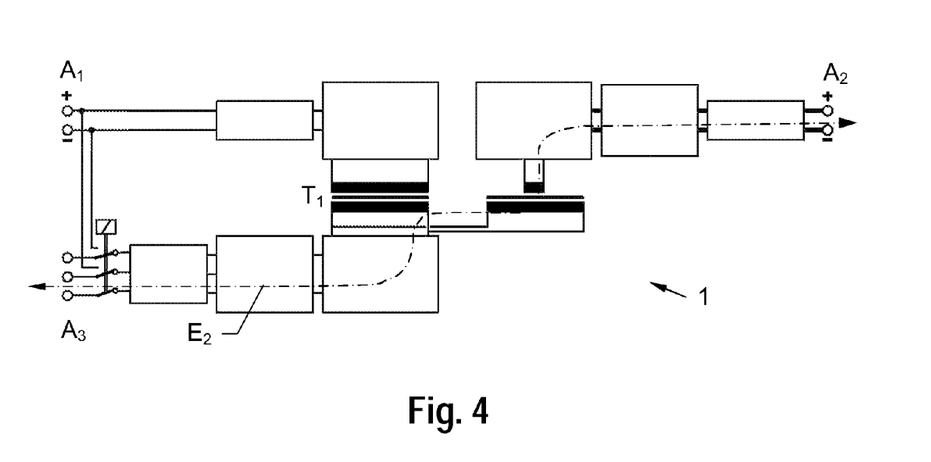
FIG. 4 schematically depicts the energy flow from a second on-board supply to a power supply in a circuit arrangement according to the invention.

If the first change-over switch US$_1$ is now brought to the second position, power can be transmitted from the power supply outside the vehicle to the second on-board supply. This energy flow E$_2$ is indicated by an arrow shown in FIG. 4. The AC voltage (here 230 VAC) is rectified to give a suitable intermediate circuit voltage and then inverted with high frequency. The electrical power is then again transmitted from the third winding W$_3$ to the second winding W$_2$ and, after subsequent rectification in the second converter UR$_2$, a voltage adaptation in the voltage transformer SW$_2$ and filtering in the second filter F$_2$, to the second connection A$_2$ and hence to the second on-board supply. In this way, for example, a low-voltage battery can be charged, for example, with or to 12 VDC or the vehicle can be supplied when stationary by a stationary or mobile (internal combustion engine emergency power unit) alternating current supply, for example if the vehicle is a recreational vehicle or the like. As is shown in FIG. 4, energy may also flow in the opposite direction, i.e. from the second on-board supply to the power supply.

In a further configuration, a driving battery of the first on-board supply can of course also be charged from the alternating current supply. The power transmission (indicated by E$_3$) then takes place between third winding W$_3$ and first winding W$_1$ (see FIG. 5). As is shown, the third converter UR$_3$ is connected via the first change-over switch US$_1$ to the third connection A$_3$. Then—provided that the first converter UR$_1$ is a bidirectional converter—electrical power can be transmitted from the first winding W$_1$ to the third winding W$_3$ or vice versa.

Figure 5:
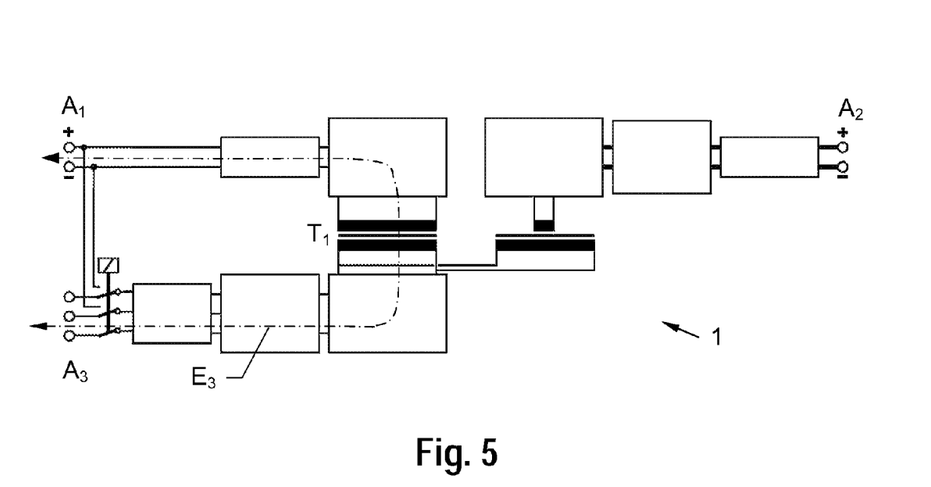
FIG. 5 schematically depicts the energy flow from a first on-board supply to a power supply in a circuit arrangement according to the invention.

In the arrangement shown, no voltage transformer is arranged between the first converter UR$_1$ and the first connection A$_1$. Although the various voltage levels in the on-board supplies or in the power supply outside the vehicle can be roughly adjusted by the ratio of the windings W$_1$, W$_2$ and W$_3$, deviations of the respective voltage from a required value due to different load situations are almost unavoidable. The voltage for the first on-board supply can therefore be suitably adjusted or regulated with the voltage transformer SW$_3$. However, this regulation is also accompanies by a change in the voltage at the second transformer winding W$_2$, so that the voltage is advantageously adapted to the second on-board supply voltage by the voltage transformer SW$_2$.

Figure 6:
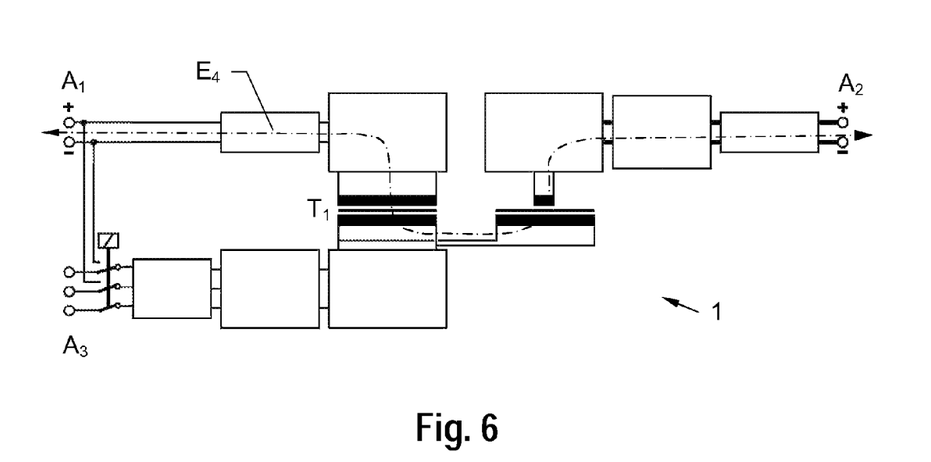
FIG. 6 schematically depicts another energy flow from a second on-board supply to a power supply in a circuit arrangement according to the invention.

In a further example shown in FIG. 6, power is transferred from the second on-board supply into the first on-board supply or into the power supply outside the vehicle respectively vice versa. One can see that for the transfer between the first on-board supply and the second on-board supply, two different routes are available, namely either the energy flow E$_1$ shown in FIG. 3 or the energy flow E$_4$ shown in FIG. 6.

The function of the circuit arrangement 1' shown in FIG. 2 is completely similar to the circuit arrangement 1 shown in FIG. 1. The statement made with a respect to FIG. 3 is therefore to be applied in context, but the energy transfer to the second on-board supply takes place here via the separate, second transformer T$_2$.

FIGS. 1 and 2 show a frequently used constellation of supplies inside and outside the vehicle. Depending on the type of the first and second on-board supply and of the power supply outside the vehicle, optionally different units shown in FIGS. 1 and 2 can be omitted in other constellations or it is advantageous to add some. This is within the ability of the person skilled in the art since the transformer-based power transmission with the aid of up-circuit and down-circuit is known per se.

Figure 7:
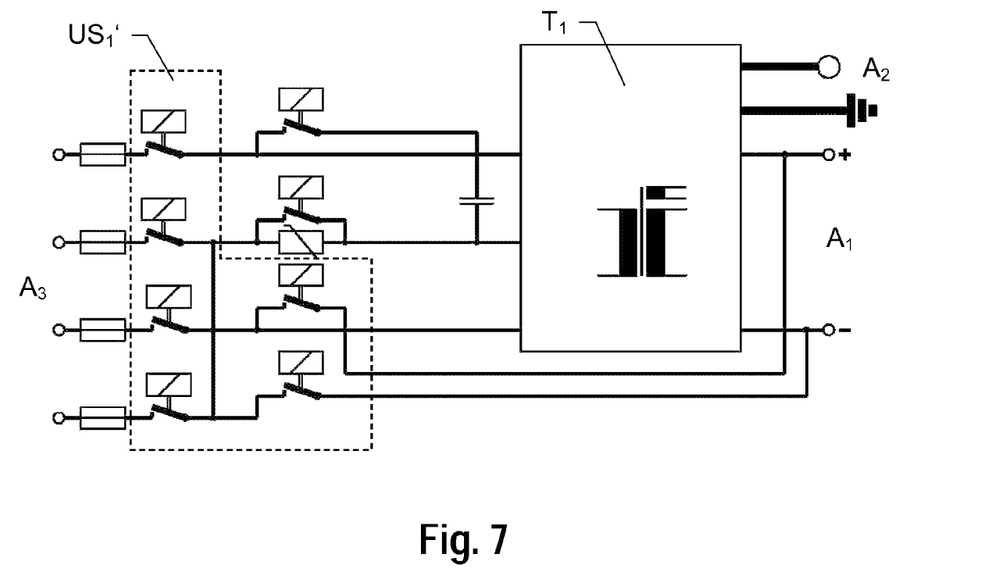
FIG. 7 shows a specific version of a first change-over switch.

FIG. 7 shows a further embodiment of a change-over switch US$_1$'. Instead of a three-pole switching relay as used in FIGS. 1 and 2, a plurality of starting/cut-out relays which are appropriately actuated are provided here. In this way, the high-voltage connections to the transformer T$_1$ can advantageously be disconnected. The six relays arranged within the region indicated by a dashed line form the change-over switch US$_1$' here. In FIG. 7, two further relays which serve for optional connection of the circuit arrangement 1 or 1' to a two-pole AC voltage supply are additionally provided.

Figure 8:
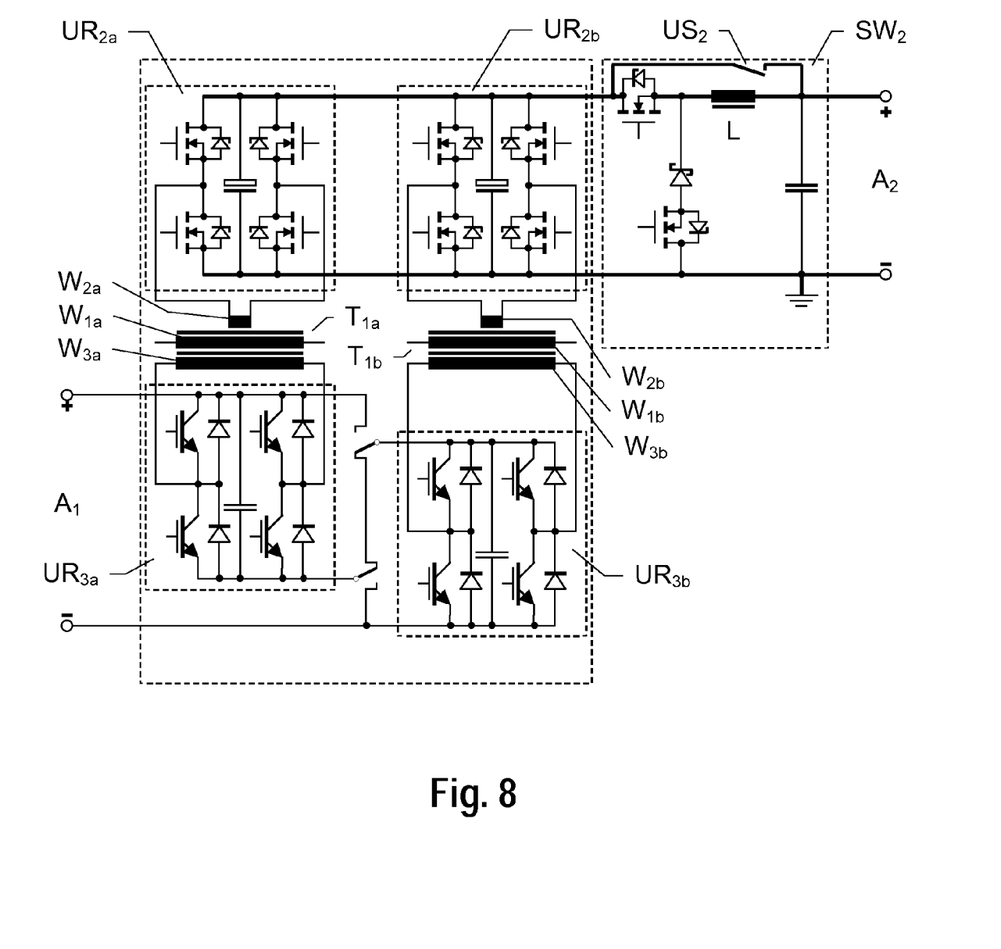
FIG. 8 shows a cut-out from a further embodiment of a circuit arrangement according to the invention having a second voltage transformer with a second change-over switch.

Furthermore, FIG. 8 shows a cut-out from a further embodiment of a circuit arrangement according to the invention, which shows a plurality of variants which in principle are independent of one another.

For example, instead of a single transformer T$_1$, two transformers T$_{1a}$ and T$_{1b}$ with the respective magnetically coupled windings W$_{1a}$, W$_{2a}$, W$_{3a}$ and W$_{1b}$, W$_{2b}$, W$_{3b}$, respectively, are provided. A bidirectional converter UR$_{3a}$ is connected to the winding W$_{3a}$, and a bidirectional converter UR$_{3b}$ is connected to the winding W$_{3b}$. The two converters UR$_{3a}$ and UR$_{3b}$ can alternatively be connected in series or in parallel. In this way, a voltage adaptation can likewise be effected, in addition or alternatively to the voltage adaptation with the aid of a voltage transformer. For example, the converters UR$_{3a}$ and UR$_{3b}$ and the windings W$_{3a}$ and W$_{3b}$, respectively, can be connected in parallel if a connection to a stationary power supply with a voltage of 230 VAC exists and can be connected in series if a connection to the first on-board supply with a voltage of 400 VDC exists.

The converters UR$_{2a}$ and UR$_{2b}$ on the side of the second on-board supply are connected rigidly in parallel in this example. However, a switching facility is of course also conceivable here. The same applies to the converter (not shown) at the first windings W$_{1a}$ and W$_{1b}$. However, it is also conceivable for only a single converter UR$_1$ or UR$_2$ to be provided for two transformer windings W$_{1a}$, W$_{1b}$ or W$_{2a}$, W$_{2b}$, respectively, which are connected in series or in parallel. Finally, the principle described can of course also be extended to include more than two windings connected in series or in parallel. For example, it is also possible to provide three windings connected in series or in parallel if this appears advantageous for the voltage adaptation.

In the examples shown, in each case a second converter U$_{2a}$ and U$_{2b}$ which are connected in a fixed manner in parallel in the example shown is connected to the second windings W$_{2a}$ and W$_{2b}$. A switching facility between series and parallel connection or a fixed series connection will of course be conceivable here too.

Moreover, FIG. 8 also shows a specific embodiment of the voltage transformer SW$_2$, here in the form of a step-down converter. As explained for FIG. 4, in the case of a supply from the power supply outside the vehicle, the voltage for the first on-board supply can be adjusted or regulated with the voltage transformer $SW_3$. The second on-board supply voltage is then adjusted accordingly with the second voltage transformer $SW_2$. However, if the energy transfer takes place from the first on-board supply to the second on-board supply as shown in FIG. 3, the voltage for the second on-board supply can in principle be adjusted with the voltage transformer $SW_3$. In a first variant, the voltage transformer $SW_2$ is therefore bypassed with a change-over switch $US_2$ (circuit branch shown as a dashed line) so that practically no electrical losses occur here. The change-over switch $US_2$ can be designed as a simple starting/cut-out relay.

Figure 9:
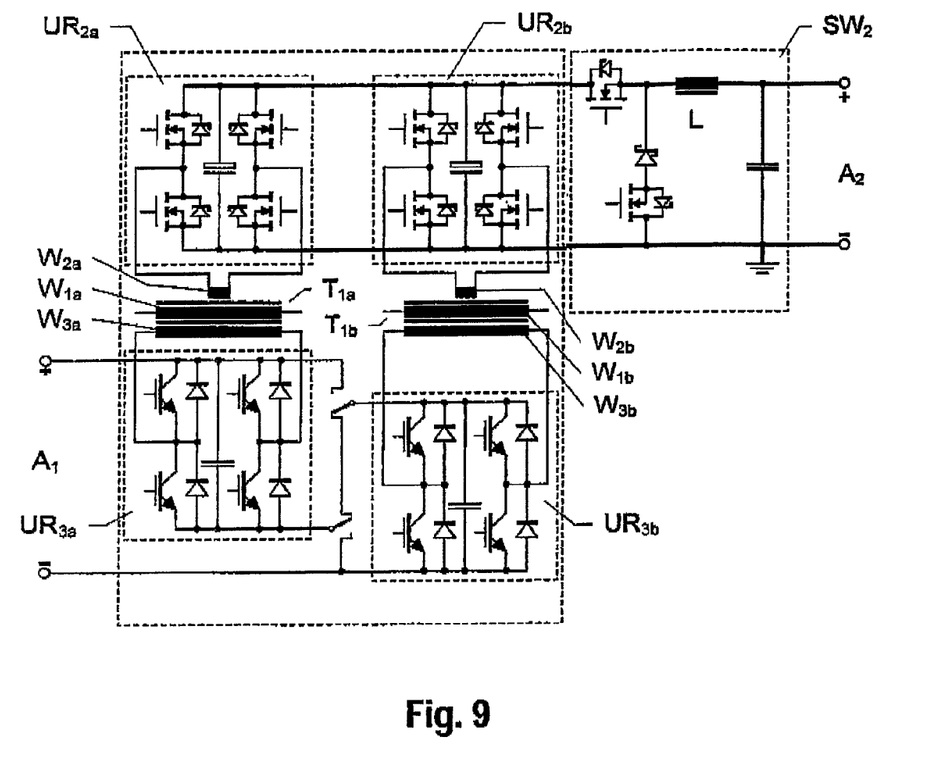
FIG. 9 shows a cut-out similar to that one of FIG. 8 but having a second voltage transformer without a second change-over switch.

In a second variant, the second change-over switch $US_2$ is dispensed with (see FIG. 9). The choke L is then advantageously designed as a nonlinear choke. As a rule, for the second on-board supply in the driving mode, i.e. in the case of supply by the first on-board supply, it is in fact necessary to provide a power which is 10 to 20 times greater than in the charging mode, i.e. in the case of supply by the power supply outside the vehicle. Although the choke winding is dimensioned for the high current in the driving mode, the magnetic circuit of the choke L is designed so that it has the high inductance required for the step-down converter function only at low current (i.e. in the charging mode). At high current, however, the magnetic circuit reaches saturation, so that the inductance of the choke L drops to very low values. The choke L could therefore be produced so as to be more compact and more economical.

Figure 10:
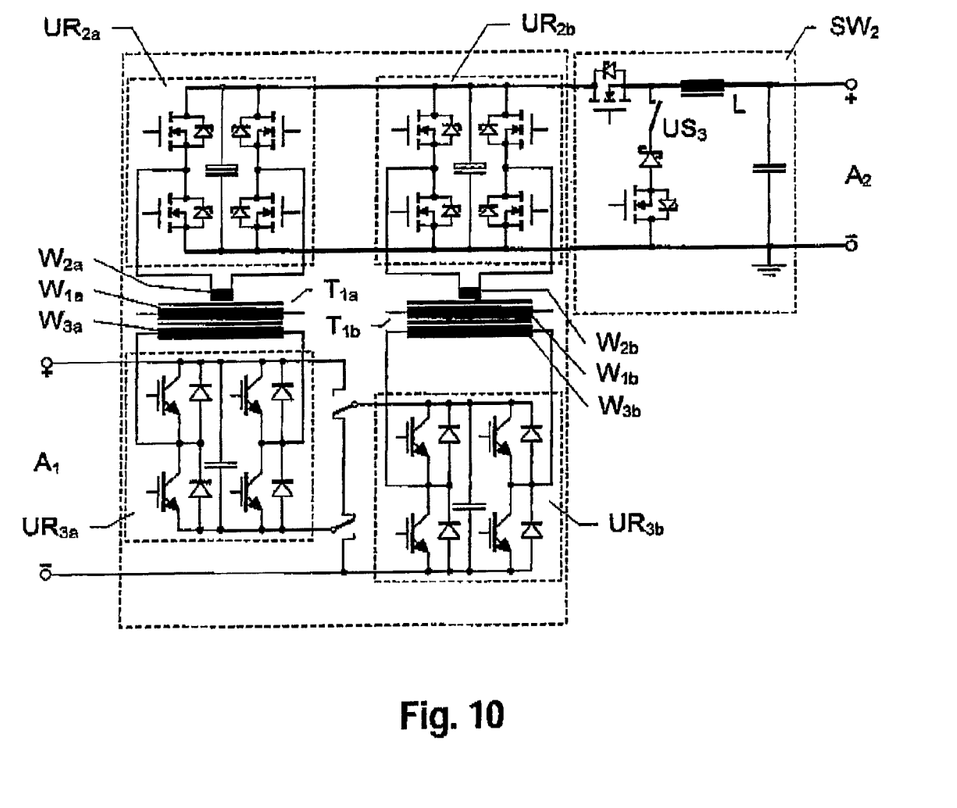
FIG. 10 shows a cut-out similar to that one of FIG. 9 but having a second voltage transformer with a switch in its diode circuit.

In a further variant of the second voltage transformer $SW_2$, a switch $US_3$ is arranged in the only weakly loaded diode circuit, for realizing polarity reversal protection (see FIG. 10). As described, this may be in the form of an MOSFET or may be designed with any desired switching element (transistor, IGBT, thyristor, relay). The "high-current polarity reversal protection" can be ensured by switching off the MOSFET in the positive wire (or switching off the second change-over switch $SW_2$).

Figure 11:
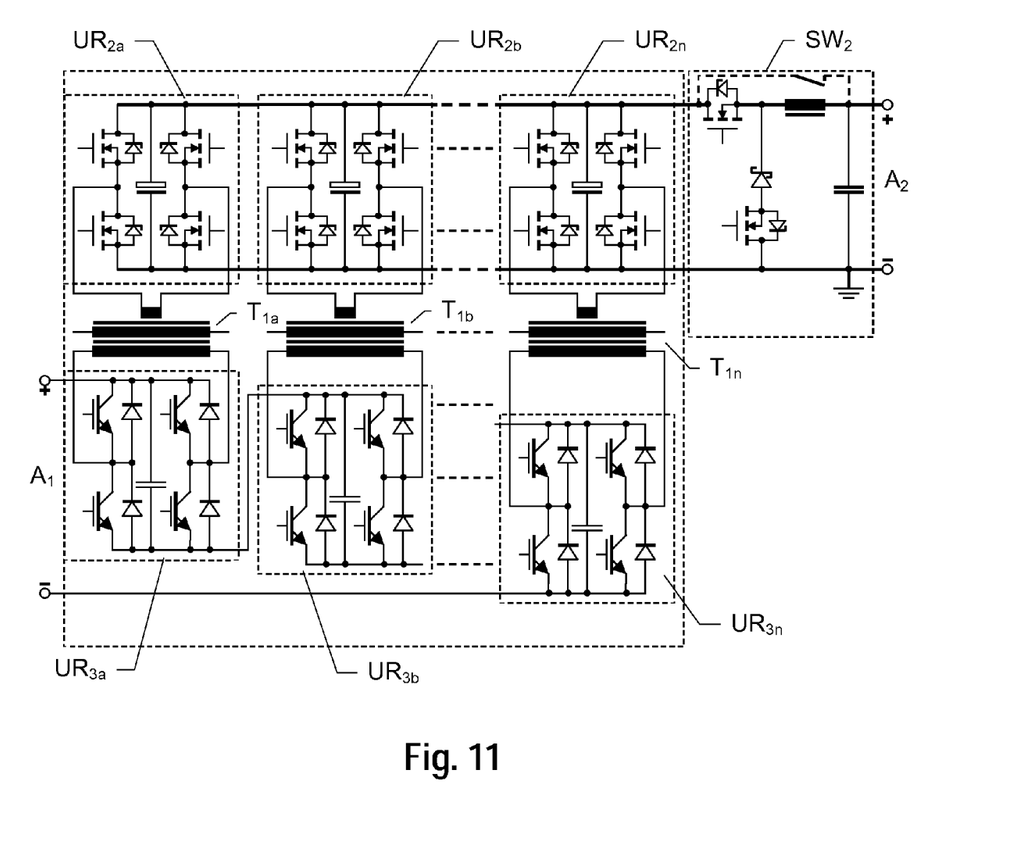
FIG. 11 shows a cut-out similar to that one of FIG. 8 but with n converters and transformers.

FIG. 11 shows yet another embodiment of the invention. Here one can see that the inventive circuit arrangement is not limited to two second converters $UR_{2a}$, $UR_{2b}$ respectively two third converters $UR_{3a}$, $UR_{3b}$. By contrast, the inventive circuit may also comprise n second converters $UR_{2a} \ldots UR_{2n}$ and n third converters $UR_{3a} \ldots UR_{3n}$ as well as n transformers $T_{1a} \ldots T_{1n}$.

Figure 12:
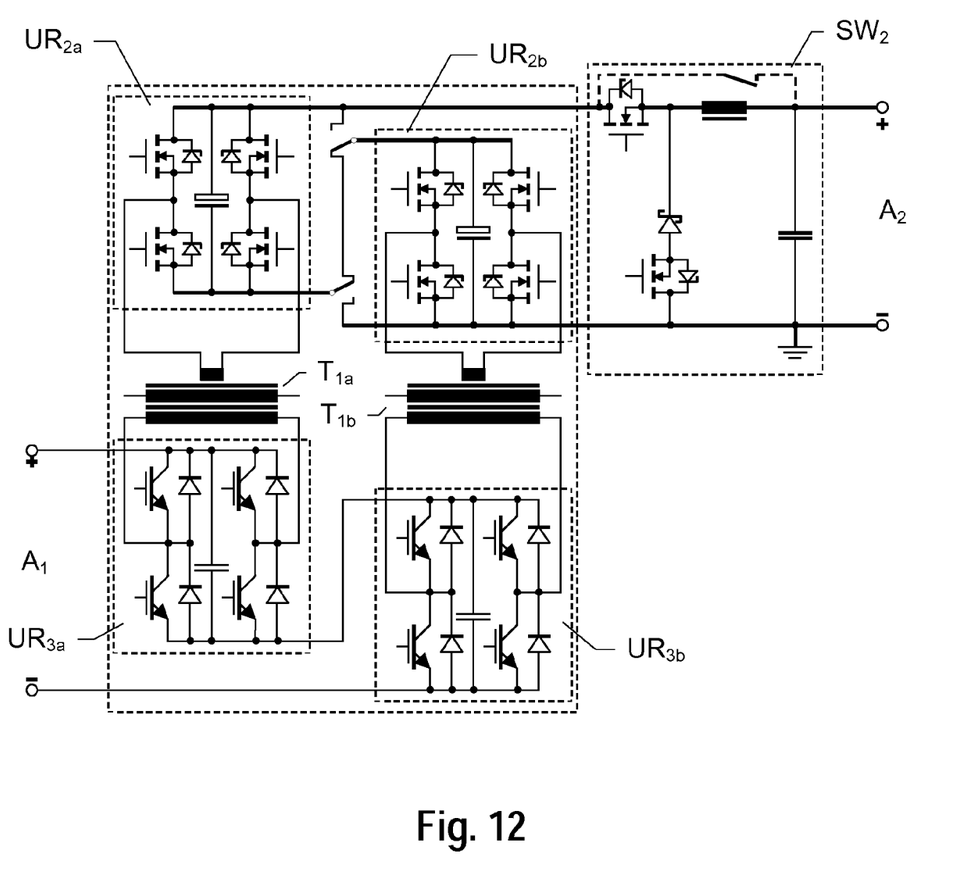
FIG. 12 shows a cut-out similar to that one of FIG. 8 but with third converters being connected in a fixed manner in series and the second converters being connected in a switched manner and FIG. 13 shows a cut-out similar to that one of FIG. 12 but with the third converters being connected in a fixed manner in parallel.

FIG. 12 shows a further variant of the invention, in which the third converters $UR_{3a}$, $UR_{3b}$ are connected in a fixed manner in series, whereas the second converters $UR_{2a}$, $UR_{2b}$ may be switched in series or in parallel.

Figure 13:
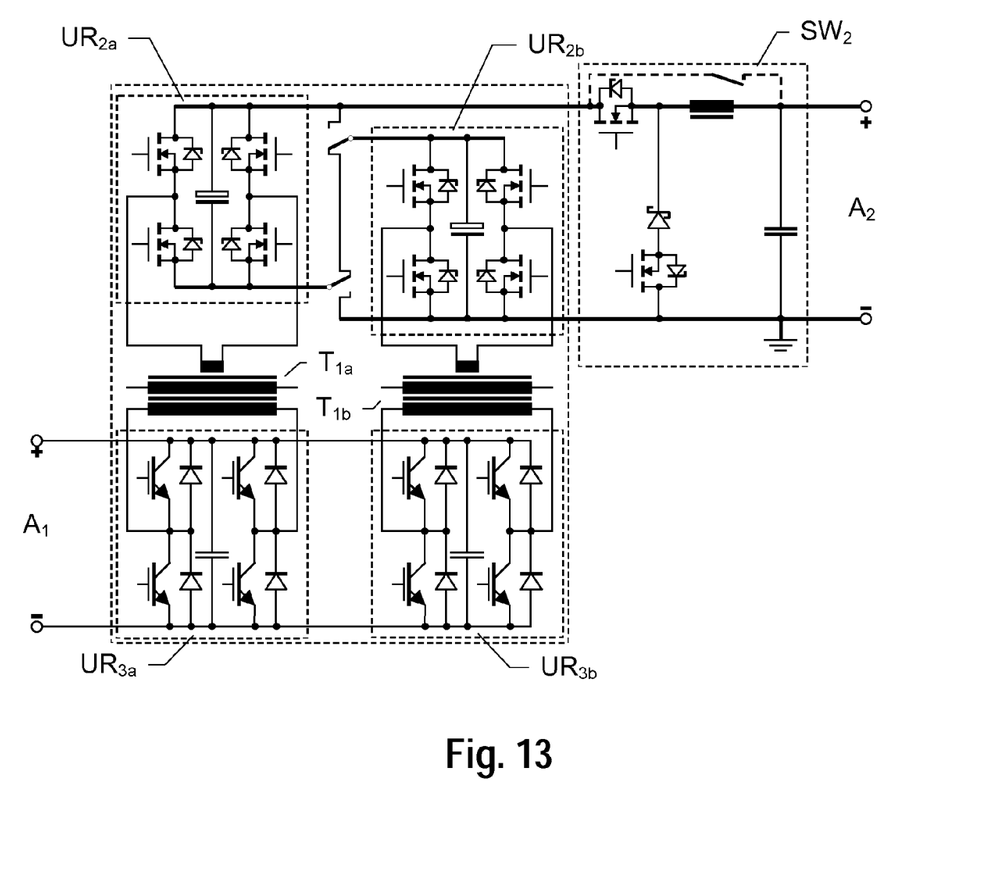

FIG. 13 finally shows a variant of the invention, in which the third converters $UR_{3a}$, $UR_{3b}$ are connected in a fixed manner in parallel, whereas the second converters $UR_{2a}$, $UR_{2b}$ again may be switched in series or in parallel. One skilled in the art of course will perceive that the different embodiments shown in the FIGS. 1 to 13 may be combined in any desired way.

Finally, it is noted that the variants shown represent only a selection of the many possibilities for a circuit arrangement 1, 1' according to the invention and must not be used for limiting the scope of use of the invention. For the person skilled in the art, it should be easy, on the basis of the considerations described here, to adapt the invention to its needs without departing from the scope of protection of the invention. In addition, it is pointed out that parts of the circuit arrangement shown in the figures can also form the basis for independent inventions.

LIST OF REFERENCE NUMERALS 1, 1' Circuit arrangement
$A_1$ Connection to the first on-board supply
$A_2$ Connection to the second on-board supply
$A_3$ Connection to a power supply outside the vehicle
$E_1 \ldots E_4$ Energy flow
$F_1, F_2, F_3$ Filter
L Choke
$SW_2, SW_3$ Voltage transformer
$T_1, T_2, T_{1a} \ldots T_{1n}$ Transformers
$UR_1$ First converter
$UR_2, UR_{2a} \ldots UR_{2n}$ Second converter
$UR_3, UR_{3a} \ldots UR_{3n}$ Third converter
$US_1, US_1'$ First change-over switch
$US_2$ Second change-over switch
$US_3$ switch
$W_1, W_{1a} \ldots W_{1n}$ First transformer windings
$W_2, W_{2a} \ldots W_{2n}$ Second transformer windings
$W_3, W_{3a} \ldots W_{3n}$ Third transformer windings
$W_4$ Fourth transformer winding

What is claimed is:

1. A circuit arrangement for power distribution in a motor vehicle, comprising:
   a first transformer stage;
   said first transformer stage having a first group of at least three magnetically coupled windings;
   a second transformer stage;
   said second transformer stage having a second group of at least three magnetically coupled windings;
   a first onboard supply;
   a first connection configured to connect to said first onboard supply;
   a first converter unit coupling said first connection to a first winding of said first group of at least three magnetically coupled windings, said first converter unit also coupling said first connection to a first winding of said second group of at least three magnetically coupled windings;
   a second onboard supply;
   a second connection configured to connect to said second onboard supply;
   a second converter unit coupling said second connection to a second winding of said first group of at least three magnetically coupled windings, said second converter unit also coupling said second connection to a second winding of said second group of at least three magnetically coupled windings;
   a second-group voltage transformer connected between said second connection and said second converter unit;
   a third connection configured to connect externally;
   a third converter unit configured to selectively couple said third connection to a third winding of said first group of at least three magnetically coupled windings, said third converter unit also configured to selectively couple said third connection to a third winding of said second group of at least three magnetically coupled windings;
   a third-group voltage transformer connected between said third connection and said third converter unit; and,
   a first change-over switch configured to controllably connect said third converter unit either to said first connection or alternatively to said third connection.

2. A circuit arrangement for power distribution in a motor vehicle as claimed in claim 1, further comprising:
   said first converter unit having a first-group first converter coupled to said first winding of said first group of at least three magnetically coupled windings;
   said first converter unit having a first-group second converter coupled to said first winding of said second group of at least three magnetically coupled windings; and,
   said first-group first converter coupled in parallel to said first-group second converter.

3. A circuit arrangement for power distribution in a motor vehicle as claimed in claim 1, further comprising:
said second converter unit having a second-group first converter coupled to said second winding of said first group of at least three magnetically coupled windings;
said second converter unit having a second-group second converter coupled to said second winding of said second group of at least three magnetically coupled windings; and,
said second-group first converter coupled in parallel to said second-group second converter.

4. A circuit arrangement for power distribution in a motor vehicle as claimed in claim 1, further comprising:
said third converter unit having a third-group first converter coupled to said third winding of said first group of at least three magnetically coupled windings; and,
said third converter unit having a third-group second converter coupled to said third winding of said second group of at least three magnetically coupled windings.

5. A circuit arrangement for power distribution in a motor vehicle as claimed in claim 4, further comprising:
a switch configured to controllably connect said third-group first converter either in parallel or alternatively in series with said third-group second converter.

6. A circuit arrangement for power distribution in a motor vehicle as claimed in claim 1, further comprising:
a second change-over switch configured to controllably bypass said second-group voltage transformer.

7. A circuit arrangement for power distribution in a motor vehicle as claimed in claim 1, further comprising:
a nonlinear choke in said second-group voltage transformer.

8. The circuit arrangement for power distribution in a motor vehicle as claimed in claim 1, wherein:
said first change-over switch is a three-pole switching relay.

9. A circuit arrangement for power distribution in a motor vehicle as claimed in claim 1, further comprising:
a plurality of starting/cut-out relays in said first change-over switch; and,
two further starting/cut-out relays configured to controllably connect said third connection to a two-pole AC voltage supply.

10. A circuit arrangement for power distribution in a motor vehicle as claimed in claim 1, further comprising:
a control configured to effect voltage adaptation between said first connection and said second connection when said first change-over switch connects said third converter unit to said first connection, and to effect voltage adaptation between said third connection and said second connection when said first change-over switch alternatively connects said third converter unit to said third connection; said control being connected to control said third-group voltage converter.

11. A circuit arrangement for power distribution in a motor vehicle, comprising:
a transformer having at least three magnetically coupled transformer windings;
a first connection for a first on-board-vehicle supply, said first supply being in electrical communication with a first converter, said first supply being coupled to a first one of said at least three transformer windings via said first converter;
a second connection for a second on-board-vehicle supply, said second supply being in electrical communication with a second converter, said second supply being coupled to a second one of said at least three transformer windings via said second converter;
a third connection for an external power supply, said third connection having a controllable electrical communication with a third converter, said third converter being coupled to to a third one of said at least three transformer windings;
a first change-over switch configured to controllably alternatively connect said third converter to one of, a) said first connection, or b) said third connection;
said transformer being one stage of a plurality having integral number n of transformer stages, each respective one of said n transformer stages having a respective group of at least three magnetically coupled windings respectively;
said first converter being part of a respective first converter unit having a plurality of integral number n of respective first converters, said first converter unit respectively coupling said first connection to said respective first windings of each one of said respective groups of at least three magnetically coupled windings of said n transformer stages respectively;
said second converter being part of a respective second converter unit having a plurality of integral number n of respective second converters, said second converter unit respectively coupling said second connection to said respective second windings of each one of said respective groups of at least three magnetically coupled windings of said n transformer stages respectively;
a second-group voltage transformer being electrically connected between said second connection and said second converter unit;
said third converter being part of a respective third converter unit having a plurality of integral number n of respective third converters each configured to selectively couple said third connection to the respective third windings of each one of said respective groups of at least three magnetically coupled windings of said n transformer stages respectively, and,
a third-group voltage transformer being electrically connected between said third connection and said third converter unit; and,
said first change-over switch is configured to controllably alternatively connect said third converter unit either, a) to said first connection or, b) to said third connection.

12. A circuit arrangement for power distribution in a motor vehicle as claimed in claim 11, further comprising:
said first converter unit having a first-group first converter coupled to a first winding of a first group of said at least three magnetically coupled windings of a first of said plurality n of transformer stages;
said first converter unit having a first-group second converter coupled to said first winding of a second group of at least three magnetically coupled windings of a second of said plurality n of transformer stages; and,
said first-group first converter is coupled in parallel to said first-group second converter.

13. A circuit arrangement for power distribution in a motor vehicle as claimed in claim 11, further comprising:
said second converter unit having a second-group first converter coupled to a second winding of a first group of at least three magnetically coupled windings of a first of said plurality n of transformer stages;
said second converter unit having a second-group second converter coupled to a second winding of a second group of at least three magnetically coupled windings of a second of said plurality n of transformer stages; and, said second-group first converter is coupled in parallel to said second-group second converter.

14. A circuit arrangement for power distribution in a motor vehicle as claimed in claim 11, further comprising:
   said third converter unit having a third-group first converter coupled to a third winding of a first group of at least three magnetically coupled windings of a first of said plurality n of transformer stages; and,
   said third converter unit having a third-group second converter coupled to a third winding of a second group of at least three magnetically coupled windings of a second of said plurality n of transformer stages.

15. A circuit arrangement for power distribution in a motor vehicle as claimed in claim 14, further comprising:
   a switch configured to controllably connect said third-group first converter either in parallel or alternatively in series with said third-group second converter.

16. A circuit arrangement for power distribution in a motor vehicle as claimed in claim 11, further comprising:
   a second change-over switch configured to controllably bypass said second-group voltage transformer.

17. A circuit arrangement for power distribution in a motor vehicle as claimed in claim 11, further comprising:
   a nonlinear choke in said second-group voltage transformer.

18. The circuit arrangement for power distribution in a motor vehicle as claimed in claim 11, wherein:
   said first change-over switch is a three-pole switching relay.

19. A circuit arrangement for power distribution in a motor vehicle as claimed in claim 11, further comprising:
   a plurality of starting/cut-out relays in said first change-over switch; and
   two further starting/cut-out relays configured to controllably connect said third connection to a two-pole AC voltage supply.

20. A circuit arrangement for power distribution in a motor vehicle as claimed in claim 11, further comprising:
   a control configured to effect voltage adaptation between said first connection and said second connection when said first change-over switch connects said third converter unit to said first connection, and to effect voltage adaptation between said third connection and said second connection when said first change-over switch alternatively connects said third converter unit to said third connection; said control being operatively connected to control said third-group voltage transformer.

* * * * *